United States Patent [19]

Yoshikawa et al.

[11] 4,113,652

[45] Sep. 12, 1978

[54] OXYGEN ABSORBENT

[75] Inventors: Yoshio Yoshikawa, Ushiku; Akira Amemiya; Toshio Komatsu, both of Tokyo; Yoshiaki Inoue, Iizuka; Megumu Yuyama, Tokyo, all of Japan

[73] Assignee: Mitsubishi Gas Chemical Company, Inc., Tokyo, Japan

[21] Appl. No.: 751,668

[22] Filed: Dec. 17, 1976

[30] Foreign Application Priority Data

Dec. 25, 1975 [JP] Japan .................................. 50-156923
Feb. 4, 1976 [JP] Japan .................................. 51-11126

[51] Int. Cl.$^2$ ........................ B01J 31/02; B01J 27/14; B01J 27/24; B01J 27/02
[52] U.S. Cl. ............................... 252/428; 252/429 R; 252/437; 252/438; 252/439; 252/188; 426/112; 426/133; 426/124; 426/418; 426/419; 426/398

[58] Field of Search ............... 252/439, 188, 428, 437, 252/438, 429 R; 426/418, 419, 398, 112, 133, 124

[56] References Cited

U.S. PATENT DOCUMENTS

| | | | |
|---|---|---|---|
| 2,825,651 | 3/1958 | Loo et al. ......................... | 252/188 X |
| 3,366,577 | 1/1968 | Miglietta .......................... | 252/439 X |
| 3,625,888 | 12/1971 | Redmore et al. ................. | 252/188 X |
| 3,862,963 | 1/1975 | Hoshi et al. ...................... | 252/428 |
| 3,954,652 | 5/1976 | Schmidt ............................ | 252/188 |
| 3,960,722 | 6/1976 | Tomikawa et al. ............... | 252/428 |

FOREIGN PATENT DOCUMENTS 4,719,729   1972   Japan.

*Primary Examiner*—Delbert E. Gantz
*Assistant Examiner*—William G. Wright
*Attorney, Agent, or Firm*—Flynn & Frishauf

[57] ABSTRACT

An oxygen absorbent comprising at least one alkaline earth metal sulfite, at least one ferrous compound and free water is disclosed.

11 Claims, 3 Drawing Figures

OXYGEN ABSORBENT

BACKGROUND OF THE INVENTION

The present ivention relates to an oxygen absorbent utilizing reducing ability of a sulfite, and particularly, an oxygen absorbent comprising at least one alkaline earth metal sulfite, at least one ferrous compound and free water. The absorbent may contain at least one ammonium salt and/or at least one filler.

In order to preserve foodstuffs, such as vegetables, fish, shellfish, meats, processed foodstuffs, such as potato chips, cakes, peanuts, etc., and so on, it is necessary to prevent the foodstuffs' from getting moldy and from putrefying. Prior art methods have used freezer storage, CA cold storage, vacuum packaging and replacing the gas present in the inner part of packaging by an inert gas for preventing foodstuffs from getting moldy and putrefying. Additives, such as antioxidant, have been used for preserving foodstuffs. Recently, governments have started to regulate the use of additives for food, since it is realized that some additives are injurious to humans. The freezer storage method requires large-scale apparatus and complicated operation, so the freezer storage method is costly.

Molds or eumycetes, bacterias and higher organisms such as insects tend to disturb preservation of foodstuffs. These mold eumycetes, bacterias and insects live and grow in the presence of oxygen and cause putrefaction and change in quality of foodstuffs.

Therefore, if oxygen can be selectively removed from the atmosphere in which the foodstuff is packed, the problem of putrefaction and change in quality of a foodstuff can be overcome, and it will become possible to preserve the foodstuff for a long time. An oxygen absorbent was known for achieving the above purpose. For example, U.S. Pat. No. 2,825,651 discloses an oxygen absorbent obtained by mixing a sulfite and a metal salt, at least one of which has water of crystallization, followed by compressing the mixture to form pellets.

In general, it was known that although a sulfite does absorb oxygen through oxidization, its rate of oxidization is very slow, even in open air. In other words even when a sulfite is allowed to stand in air for several months, the sulfite hardly changes. Therefore, a sulfite can not be used as it is for preventing putrefaction and change in quality of foodstuffs. It was also known that when a metal salt and a sulfite are present in the state of an aqueous solution, the metal salt acts as a catalyst for oxidizing the sulfite. When the sulfite and the metal salt are prsent in solid state, the metal salt has little catalytic action. Therefore, U.S. Pat. No. 2,825,652 proposes a process for preparing an oxygen absorbent comprising mixing a finely divided sulfite and a finely divided metal salt and compression-pelletizing the mixture in order to increase the rate of the oxidation of the sulfite. However, the process of U.S. Pat. No. 2,825,651 requires powdering apparatus and compression apparatus and complicated operation. Also, it was found that the increase in the rate of oxidation of the sulfite was not sufficient. That is, it was found that the pellets prepared by mixing a sulfite powder and a metal salt powder, both having an average particle size of less than 100 microns, followed by pelletizing the mixture have a low oxygen-absorbing rate.

SUMMARY OF THE INVENTION

One object of this invention is to provide an oxygen absorbent having excellent oxygen-absorbing power without the above-mentioned disadvantages.

DETAILED DESCRIPTION OF THE INVENTION

Figure 1:
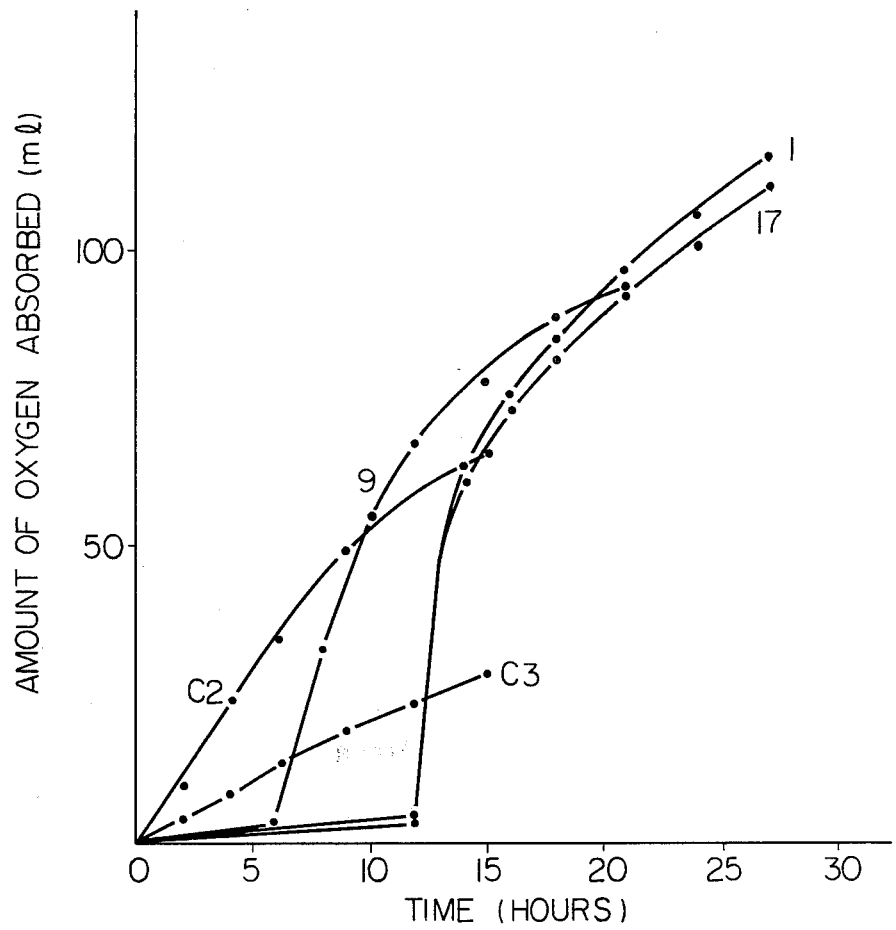
FIG. 1 is a graph showing changes in amounts of oxygen absorbed with time by the product of this invention in comparison with the products of the prior art; the lines $C_2$ and $C_3$ in FIG. 1 represent Comparative Examples 2 and 3, respectively, and the figures in the lines in FIG. 1 correspond to numbers of Examples.

An oxygen absorbent of this invention comprises (a) at least one alkaline earth metal sulfite, (b) at least one ferrous compound and (c) free water. The absorbent may contain at least one ammonium salt and/or at least one filler in addition to the above three components.

The term "oxygen absorbent" in the specification and claims means an agent for absorbing oxygen.

The term "free water" in the specification and claims means water not bonded to other components and excludes water of crystallization.

The oxygen absorbent of this invention does not absorb oxygen before being placed in a container, but the absorbent starts to absorb oxygen as soon as or a little after it is placed in a container.

The term "latent period" means period wherein oxygen absorbent does not substantially absorb oxygen after the preparation of the absorbent.

Examples of the alkaline earth metal sulfites include anhydrides or hydrides of calcium sulfite, magnesium sulfite, barium sulfite and mixtures thereof, and the mixtures of the alkaline earth metal sulfite and a hydrogen sulfite.

It is unnecessary to use a pure alkaline earth metal sulfite in the present invention. Recently desulfuration of waste smoke has been widely carried out in order to prevent environmental pollution. The alkaline earth metal sulfite obtained in the desulfuration can be used for preparing the oxygen absorbent of this invention without any treatment of the sulfite. Since such alkaline earth metal sulfite is cheap, the use of such sulfite is preferred.

The ferrous compound employed in the present invention may be in the form of a single salt, a double salt or a complex salt. The ferrous compounds include for example, ferrous sulfate, ferrous chloride, ferrous bromide, ferrous nitrate, ferrous phosphate, ferrous oxalate, ferrous formate and mixture thereof. The ferrous compound which can be employed in the present invention may be anhydrous as well as hydrous. For example, hydrous ferrous compounds, namely ferrous compounds having water of crystallization may also be employed in the present invention. The ferrous compound may be employed in the form of metal chelate compound obtained by combining the ferrous compounds with a chelating agent, such as EDTA and the like.

In general, the ferrous compound in the range of from about 0.1 part to about 150 parts by weight, preferably from about 1 part to about 75 parts by weight, may be used per 100 parts by weight of the alkaline earth metal sulfite. However, addition of too much of the ferrous compound is meaningless, because an extra portion of the ferrous compound does not participate in the oxygen-absorption reaction.

The oxygen absorbent of this invention may contain a variety of additives, such a filler on a dispersing agent.

The amount of free water added may be in an amount of from about 2 to 200 parts by weight, preferably from about 4 to about 100 parts by weight, most preferably from about 4 to about 50 parts by weight, per 100 parts by weight of the other solid components. The solid components comprise (a) an alkaline earth metal sulfite and a ferrous compound, (b) an alkaline earth metal sulfite, a ferrous compound and an ammonium salt, (c) an alkaline earth metal sulfite, a ferrous compound and a filler and (d) an alkaline earth metal sulfite, a ferrous compound, an ammonium slat and a filler.

When the solid components present in the oxygen absorbent contain water of crystallization, the crystal water is not included in the free water.

When the amount of the free water added is less than 2 parts by weight per 100 parts by weight of the solid components, the amount of oxygen to be absorbed is reduced. When the amount of the free water added is more than 200 parts by weight per 100 parts by weight of the solid components, the oxygen absorbent changes to the state of a paste or slurry. Therefore, it not only becomes inconvenient to handle the absorbent, but also, the oxygen-absorbing rate thereof is lowered. As a result, the absorption reaction tends to take a long time.

The oxygen absorbent described above has high oxygen absorbing power. In addition, by selecting suitable kinds and proportions of the components, its latent period wherein it does not substantially absorb oxygen after the preparation of the oxygen absorbent can be extended to from 6 to 15 hours.

When an oxygen absorbent contains at least one alkaline earth metal sulfite, at least one ferrous compound and free water as well as at least one ammonium salt, the oxygen absorbent has the following advantage. By selecting suitable kinds and proportions of the ammonium salt(s), its latent period can be varied to from more than 0 hour up to 50 hours. When the ammonium salt is ammonium sulfate, the latent period can be extended to from more than 0 to 25 hours. When the ammonium salt is ammonium chloride, the latent period can be extended to from 6 to 50 hours. This control over the latent period makes the handling of the oxygen absorbent of the present invention easy in comparison with the handling of prior art oxygen absorbents.

The ammonium salts include an ammonium salt of an inorganic acid or organic acid. An ammonium salt of an inorganic acid is preferred. Examples of the ammonium salt of inorganic acid include ammonium sulfate, ammonium chloride and ammonium nitrate. The ammonium salt of an organic acid includes an ammonium salt of aliphatic carboxylate, such as ammonium acetate. Either one or two of the ammonium salts can be used considering the length of latent period desired.

Advantageously, the amount of the ammonium salt added may be at least 1 part by weight, preferably at least 5 parts by weight per 100 parts, of the alkaline earth metal sulfite. Upper limit of the amount of the ammonium salt is not critical. When an oxygen absorbent having a longer latent period is required, the upper limit of the amount of the ammonium salt should be determined in view of the description of FIG. 2 and Examples 18, 20, 22 and 24. However, when an oxygen absorbent having a shorter latent period is required for a particular use, the ratio of the ammonium salt to the sulfite should be large in view of the above FIG. and Examples. An oxygen absorbent having too much of the ammonium salt is usable in the present invention, since an extra portion of the ammonium salt does not participate in the oxygen-absorption reaction.

The other additives, such as a filler or a dispersing agent which can be contained in the oxygen absorbent of this invention do not participate in the oxygen-absorption reaction. However, the oxygen-absorbing power is improved by incorporating a filler or a dispersing agent in the oxygen absorbent, because the surface area of the oxygen absorbent in contact with oxygen increases. The fillers or the dispersing agents include, for example, gypsum, $BaSO_4$, diatomaceous earth, perlite, cellulose, zeolite, activated clay, silica gel and activated carbon. When a large amount of free water is present in the oxygen absorbent, the absorbent becomes pasty or a slurry. The filler or the dispersing agent prevents the oxygen absorbent from changing to a pasty or slurry state, and also increases the oxygen-absorbing rate.

An alkaline material may be incorporated in the oxygen absorbent for increasing the rate of absorbing oxygen after the latent period. The term "alkaline material" means material which raises the pH to more than 7 when it is mixed with water. The alkaline materials include, for example $NaOH$, $Na_2CO_3$, $NaHCO_3$, $KOH$, $K_2CO_3$, $KHCO_3$, $Ca(OH)_2$, $CaCO_3$, $Ba(OH)_2$, $Mg(OH)_2$, $CH_3COONa$, $(CH_3COO)_2Ca$ as well as nitrogen-containing basic organic compounds, such as amines and pyridine. When the alkaline material is incorporated in the oxygen absorbent, the amount of the alkaline material incorporated advantageously ranges from about 0.05 to about 1 equivalent, preferably from about 0.1 to about 0.8 equivalent, per 1 equivalent of the ferrous compound.

A special means is unnecessary for preparing the oxygen absorbent. In addition, it is unnecessary to reduce the components to powder before mixing them. However, it is preferred that each component be uniformly distributed in the absorbent, so the use of a sulfite, a hydrogensulfite and a ferrous compound in large pieces is not preferred.

The preparation of the oxygen absorbent can be carried out by any method. For example, after the dry components are blended, water is added to the blend. Alternatively, a ferrous compound, an ammonium salt and water are blended to form a solution or a slurry, and then a sulfite is added to the solution or the slurry. A neader mixer, an internal mixer, a rollmil, a bagmil, a gear compounder and the like can be used for the blending operation.

Figure 2:
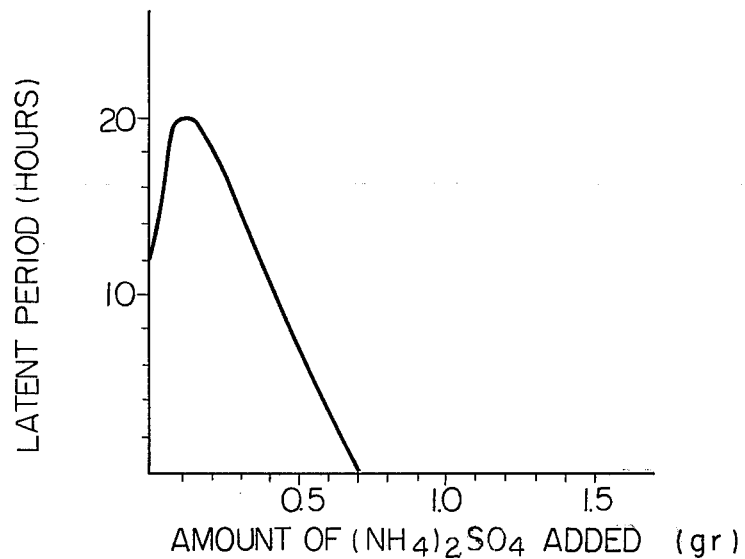
FIG. 2 is a graph showing the relationship between the latent period and the amount of an ammonium salt incorporated in the oxygen absorbent.

For example, an oxygen absorbent comprising 2.0 gr of $CaSO_3 \cdot \frac{1}{2} H_2O$, 0.31 gr of $FeSO_4 \cdot 7 H_2O$ and 0.4 gr of free water has an latent period of 12 hours. When $(NH_4)_2SO_4$ is added to the above oxygen absorbent, its latent period changes as shown in FIG. 2. Its latent period varies from 0 to 20 hours according to the difference in amount of the ammonium salt added. That is, when the ammonium salt in an amount of less than 0.1 gr is added to the above oxygen absorbent, its latent period becomes longer. When the ammonium salt in an amount of more than 0.1 gr is added to the above oxygen absorbent, its latent period becomes shorter, and, if the ammonium salt in an amount of more than 0.7 gr is added to the above oxygen absorbent, its latent period becomes 0.

Figure 3:
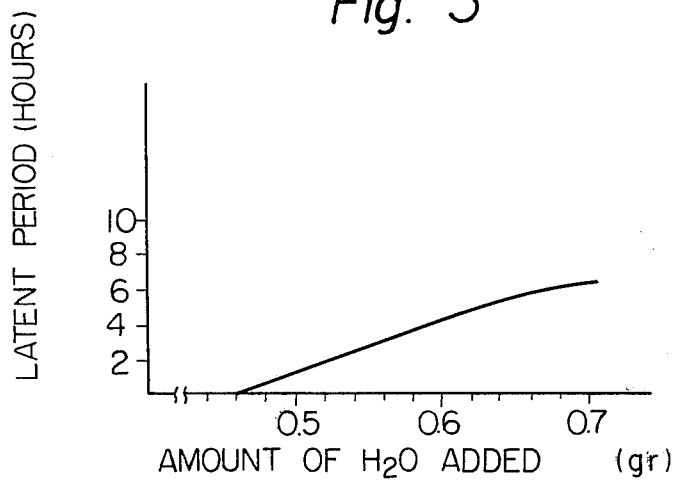
FIG. 3 is a graph showing the relationship between the latent period and the amount of free water incorporated in the oxygen absorbent.

When the amount of the ammonium sulfate is kept constant, the latent period can be adjusted by changing the amount of free water. For example, FIG. 3 is a graph showing the relationship between the oxygen absorbent's latent period and the amount of free water incorporated in the composition comprising 2.1 gr of $CaSO_3 \cdot \frac{1}{2} H_2O$, 0.31 gr of $FeSO_4 \cdot 7H_2O$ and 1.0 gr of $(NH_4)_2SO_4$.

In other words, the latent period of the oxygen absorbent can be adjusted by changing the amount of $(NH_4)_2SO_4$ or by keeping the amount of the ammonium salt constant and changing the amount of free water.

Depending upon the time before packaging of food in a sealed container, the latent period of the oxygen absorbent of this invention can be freely adjusted by varying the proportions of the components. It becomes possible to absorb oxygen immediately after packaging; that is, if desired, said latent period can be reduced to zero by selecting the kinds of the components and the proportion thereof.

The oxygen absorbent of this invention has the further advantage that it does not generate a sulfurous acid gas when the absorbent absorbs oxygen.

The oxygen absorbent of this invention has a variety of uses, but is particularly useful for preventing change in quality of fresh vegetables, fresh fish and shellfish, and processed foodstuffs, such as potato chips, cakes, peanuts and so on.

In addition, the oxygen absorbent can be used for controlling insects in clothes, for preventing clothes, shoes, etc. from getting moldy, for preventing rust in a metal and for preventing change in quality of chemical products.

The present invention is further illustrated by the following Examples and Comparative Examples. However, this invention should not be limited by these examples and comparative examples.

EXAMPLES 1 – 15

A variety of the oxygen absorbents of this invention were prepared using the kinds and the proportions of the compounds as shown in Table 1. Each of the oxygen absorbents was placed in a 1 l sealed vessel equipped with a Hg manometer, which has 210 ml of oxygen therein; and the tests were carried out at 25° C in which the amount of oxygen absorbed by each one of the absorbents was measured by determining the internal pressure of the vessel. The results are shown in Table 1.

Table 1

| Ex. No. | Absorbent | | Latent Period (Hr) and amount of $O_2$ absorbed during latent period (ml) | | Amount of $O_2$ absorbed with time (in hours) after the latent period (ml) | | | | | |
|---|---|---|---|---|---|---|---|---|---|---|
| | | | Hr | ml | 2 Hrs | 4 Hrs | 6 Hrs | 9 Hrs | 12 Hrs | 15 Hrs |
| 1 | $CaSO_3 \cdot \frac{1}{2} H_2O$<br>$FeSO_4 \cdot 7H_2O$<br>$H_2O$ | 2.0$^g$<br>0.31<br>0.6 | 12 | 5 | 63 | 76 | 85 | 97 | 106 | 116 |
| 2 | $CaSO_3 \cdot 2H_2O$<br>$FeSO_4 \cdot 7H_2O$<br>$H_2O$ | 2.4<br>0.31<br>0.5 | 12 | 4 | 69 | 81 | 88 | 95 | 101 | 186 |
| 3 | $CaSO_3$<br>$FeSO_4$<br>$H_2O$ | 1.9<br>0.17<br>0.7 | 12 | 5 | 58 | 71 | 79 | 89 | 100 | 111 |
| 4 | $CaSO_3$<br>$FeCl_2$<br>$H_2O$ | 1.9<br>0.05<br>0.6 | 7 | 1 | 36 | 55 | 69 | 78 | 83 | 86 |
| 5 | $CaSO_3 \cdot \frac{1}{2} H_2O$<br>$Fe(NO_3)_2 \cdot 6H_2O$<br>$H_2O$ | 2.0<br>0.12<br>0.3 | 9 | 3 | 31 | 49 | 65 | 83 | 94 | 100 |
| 6 | $CaSO_3 \cdot H_2O$<br>$Fe_3(PO_4)_2 \cdot 2H_2O$<br>$H_2O$ | 2.1$^g$<br>1.5<br>0.7 | 15 | 2 | 20 | 34 | 47 | 63 | 76 | 86 |
| 7 | $CaSO_3 \cdot \frac{1}{2} H_2O$<br>$(COO)_2Fe \cdot 2H_2O$<br>$H_2O$ | 2.0<br>0.32<br>0.4 | 12 | 2 | 28 | 46 | 60 | 76 | 91 | 96 |
| 8 | $CaSO_3 \cdot \frac{1}{2} H_2O$<br>$(HCOO)_2Fe$<br>$H_2O$ | 2.0<br>0.32<br>0.4 | 13 | 3 | 17 | 31 | 43 | 57 | 67 | 74 |
| 9 | $CaSO_3 \cdot \frac{1}{2} H_2O$<br>$FeSO_4 \cdot 7H_2O$<br>EDTA-2Na salt<br>$H_2O$ | 2.0<br>0.25<br>0.35<br>0.4 | 6 | 3 | 33 | 54 | 68 | 78 | 89 | 94 |
| 10 | $MgSO_3 \cdot 6H_2O$<br>$FeSO_4 \cdot 7H_2O$<br>$H_2O$ | 3.3<br>0.31<br>0.6 | 9 | 4 | 45 | 72 | 83 | 91 | 96 | 103 |
| 11 | $BaSO_3$<br>$FeCl_2 \cdot 4H_2O$<br>$H_2O$ | 3.5<br>0.08<br>0.6 | 13 | 4 | 33 | 53 | 66 | 75 | 80 | 83 |
| 12 | $CaSO_3 \cdot \frac{1}{2} H_2O$<br>$Ca(HSO_3)_2$<br>$FeSO_4 \cdot 7H_2O$<br>$H_2O$ | 1.5$^g$<br>0.8<br>0.31<br>0.6 | 11 | 5 | 63 | 75 | 83 | 91 | 97 | 103 |
| 13 | $MgSO_3 \cdot 6H_2O$<br>$Mg(HSO_3)_2$<br>$FeCl_2$ | 3.0<br>0.3<br>0.04 | 9 | 4 | 39 | 53 | 64 | 77 | 88 | 96 |

Table 1-continued

| Ex. No. | Absorbent | | Latent Period (Hr) and amount of $O_2$ absorbed during latent period (ml) | | Amount of $O_2$ absorbed with time (in hours) after the latent period (ml) | | | | | |
|---|---|---|---|---|---|---|---|---|---|---|
| | | | Hr | ml | 2 Hrs | 4 Hrs | 6 Hrs | 9 Hrs | 12 Hrs | 15 Hrs |
| 14 | $H_2O$ | 0.6 | | | | | | | | |
| | $CaSO_3 \cdot \frac{1}{2} H_2O$ | 2.0 | | | | | | | | |
| | $FeSO_4 \cdot 7H_2O$ | 0.28 | | | | | | | | |
| | $FeCl_2 \cdot 4H_2O$ | 0.02 | 11 | 4 | 54 | 70 | 79 | 91 | 97 | 103 |
| | $(HCOO)_2Fe$ | 0.02 | | | | | | | | |
| | $H_2O$ | 0.5 | | | | | | | | |
| 15 | $CaSO_3 \cdot \frac{1}{2} H_2O$ | 0.8 | | | | | | | | |
| | $Ca(HSO_3)_2$ | 0.4 | | | | | | | | |
| | $MgSO_3 \cdot 6H_2O$ | 1.5 | | | | | | | | |
| | $Mg(HSO_3)_2$ | 0.2 | 11 | 5 | 40 | 61 | 76 | 89 | 100 | 105 |
| | $BaSO_3$ | 0.2 | | | | | | | | |
| | $FeSO_4 \cdot 7H_2O$ | 0.25 | | | | | | | | |
| | $FeCl_2$ | 0.01 | | | | | | | | |
| | $H_2O$ | 0.5 | | | | | | | | |

COMPARATIVE EXAMPLES 1 – 7

A number of compositions were prepared using the kinds and proportions of components as shown in Table 2. The compositions were placed in 1l sealed vessels respectively, and the amount of oxygen absorbed by each composition was measured in the same way as in Examples 1 – 15. There was no latent period. The results are shown in Table 2.

Table 2

| Ex. No. | Composition | | Amount of $O_2$ absorbed with time (in hours) after preparation of the composition | | | | | | |
|---|---|---|---|---|---|---|---|---|---|
| | | | 2 Hrs | 4 Hrs | 6 Hrs | 9 Hrs | 12 Hrs | 15 Hrs | 50 Hrs |
| 1 | $Na_2SO_3$ | 2.0 g | 0 | 0 | 0 | 0 | 0 | 1 | 1 |
| | $FeSO_4 \cdot 7H_2O$ | 0.31g | | | | | | | |
| | $H_2O$ | 0.6 g | | | | | | | |
| 2 | $Na_2SO_3$ | 2.0 g | 10 | 24 | 34 | 50 | 59 | 66 | |
| | $FeSO_4 \cdot 7H_2O$ | 0.25g | | | | | | | |
| | $H_2O$ | 0.65g | | | | | | | |
| 3 | $CaSO_4 \cdot 2H_2O$ | 2.0 g | | | | | | | |
| | $CaSO_3 \cdot \frac{1}{2} H_2O$ | 2.0 g | | | | | | | |
| | $Fe_2(SO_4)_3$ | 0.05g | 4 | 8 | 13 | 19 | 24 | 29 | |
| | $H_2O$ | 0.6 g | | | | | | | |
| 4 | $CaSO_3 \cdot \frac{1}{2} H_2O$ | 2.0 g | | | | | | | |
| | $FeCl_3 \cdot 6H_2O$ | 0.17g | 5 | 9 | 14 | 24 | 33 | 43 | |
| | $H_2O$ | 0.5 g | | | | | | | |

| Ex. No. | Composition | | Rate of oxygen-absorption after preparation of the composition |
|---|---|---|---|
| 5 | $CaSO_3 \cdot \frac{1}{2} H_2O$ | 2.0 gr. | No oxygen was absorbed, even after one week |
| | $FeSO_4 \cdot 7 H_2O$ | 0.31gr. | |
| 6 | $CaSO_3 \cdot \frac{1}{2} H_2O$ | 2.0 gr. | No oxygen was absorbed, even after one week |
| | $FeSO_4 \cdot 7 H_2O$ | 0.31gr. | |
| | Two components having average particle size of less than 100 microns were mixed and pelletized. | | |
| 7 | $CaSO_3 \cdot \frac{1}{2} H_2O$ | 2.0 gr. | Only 2 ml of oxygen was absorbed even after 24 hours |
| | $FeSO_4 \cdot 7 H_2O$ | 0.31gr. | |
| | $H_2O$ | 4.8 gr. | |
| | This composition was pasty | | |

EXAMPLE 16

2.0 gr of $CaSO_4 \cdot 2 H_2O$ as a filler was incorporated in the composition of Comparative Example 7. The measurement of oxygen absorption was carried out in the same way and under the same conditions as in Examples 1 – 15. The latent period of the oxygen absorbent was 9 hours. 9 ml of oxygen was absorbed during the latent period. The amount of oxygen absorbed with time (in hours) after the latent period is shown below.

| Hr | Amount of oxygen absorbed (ml) |
|---|---|
| 2 | 60 |
| 4 | 73 |
| 6 | 81 |
| 9 | 93 |
| 12 | 101 |
| 15 | 111 |

EXAMPLE 17

Waste gas from a boiler was contact-treated with a 7% slurry of $Ca(OH)_2$ to convert $SO_2$ contained in a gas to $CaSO_3$, thereby catching $CaSO_3$ so formed in the slurry. The resulting slurry was dehydrated by a pressurizing step and filtration to obtain a cake-like material comprising 52% by weight of $CaSO_3.\frac{1}{2} H_2O$, 23% by weight of $CaSO_4.2 H_2O$ and 25% by weight of water.

0.31 gr. of $FeSO_4.7 H_2O$ was added to 40 gr. of the material; and the two components were mixed. The resulting mixture was placed in a 1l sealed vessel. The measurement of oxygen absorbed was carried out at 25° C in the same way as in Examples 1 – 15. The latent period of the oxygen absorbent was 12 hours. 4 ml of oxygen was absorbed durin the latent period. The amount of oxygen absorbed with time (in hours) after the latent period is shown below.

| Hrs | Amount of $O_2$ absorbed (ml) |
| --- | --- |
| 2 | 60 |
| 4 | 73 |
| 6 | 81 |
| 9 | 93 |
| 12 | 101 |
| 15 | 111 |

EXAMPLE 18

Ten test samples of mixtures comprising 1.9 gr of $CaSO_3$, 0.17 gr of $FeSO_4$ and 0.7 gr of free water were prepared. $(NH_4)_2SO_4$ in an amount as shown in Table 3 was added to each of the mixtures. The resulting mixtures were placed in 10 sealed vessels, respectively, and the measurement of oxygen absorption was carried out at 25° C in the same way and under the same conditions as in Examples 1 – 15. The latent period and the amount of oxygen absorbed were measured. The results are shown in Table 3. It is apparent from Table 3 that the latent period can be adjusted within the range of from 0 hour to 22 hours, and that in all cases the oxygen absorbent has excellent oxygen-absorbing power after the latent period.

Table 3

| | | Amount of $(NH_4)_2SO_4$ added (gr) | Latent period (Hr) and amount of $O_2$ absorbed (ml) | | Amount of $O_2$ absorbed with time (in hours) after the latent period (ml) | | | | | |
| --- | --- | --- | --- | --- | --- | --- | --- | --- | --- | --- |
| | | | | | 2 Hrs | 4 Hrs | 6 Hrs | 9 Hrs | 12 Hrs | 15 Hrs. |
| Control | | 0 | 12 Hr | 5 ml | 58 | 80 | 92 | 101 | 108 | 111 |
| Experiment No. | 1 | 0.05 | 16 | 5 | 49 | 74 | 84 | 93 | 99 | 102 |
| | 2 | 0.1 | 20 | 5 | 41 | 69 | 80 | 90 | 94 | 99 |
| | 3 | 0.2 | 18 | 5 | 47 | 72 | 83 | 94 | 101 | 106 |
| | 4 | 0.3 | 14 | 5 | 55 | 77 | 88 | 99 | 105 | 109 |
| | 5 | 0.5 | 7 | 4 | 63 | 84 | 94 | 103 | 110 | 113 |
| | 6 | 0.7 | 1 | 3 | 69 | 87 | 96 | 106 | 113 | 116 |
| | 7 | 1.0 | 0 | — | 69 | 86 | 96 | 107 | 114 | 118 |
| | 8 | 2.0 | 0 | — | 70 | 87 | 96 | 107 | 113 | 117 |
| | 9 | 4.0 | 0 | — | 69 | 86 | 95 | 106 | 113 | 117 |

EXAMPLE 19

Four test samples of mixtures comprising 1.9 gr. of $CaSO_3$, 0.17 gr of $FeSO_4$ and 1.0 gr of $(NH_4)_2SO_4$ were prepared. Free water in the amount as shown in Table 4 was added to each of the mixtures. The resulting mixtures were placed in 4 sealed vessels respectively, and the measurement was carried out in the same way as in Example 18. The results are shown in Table 4.

Table 4

| Experiment No. | Amount of free water added (gr) | Latent period (Hr.) and amount of $O_2$ absorbed (ml) | | Amount of $O_2$ absorbed with time (in hours) after the latent period (ml) | | | | | |
| --- | --- | --- | --- | --- | --- | --- | --- | --- | --- |
| | | Hr. | ml | 2 Hrs | 4 Hrs | 6 Hrs | 9 Hrs | 12 Hrs | 15 Hrs |
| 1 | 0.70 | 0 | — | 69 | 86 | 96 | 107 | 114 | 118 |
| 2 | 0.80 | 1 | 3 | 69 | 86 | 96 | 107 | 114 | 118 |
| 3 | 0.90 | 5 | 4 | 66 | 85 | 95 | 106 | 113 | 117 |
| 4 | 1.00 | 7 | 4 | 64 | 84 | 94 | 104 | 111 | 114 |

EXAMPLE 20

Ten test samples of mixtures comprising 3.3 gr of $BaSO_3$, 0.08 gr of $FeCl_2.4 H_2O$ and 0.6 gr of free water were prepared.

Ammonium sulfate in an amount as shown in Table 5 was added to each of the mixtures. The resulting mixtures were placed in 10 sealed vessels respectively, and the test was carried out in the same way as in Example 18. The results are shown in Table 5.

Table 5

| | Amount of $(NH_4)_2SO_4$ added (gr) | Latent period (Hrs) and amount of $O_2$ absorbed (ml) | | Amount of $O_2$ absorbed with time (in hours) after the latent period (ml) | | | | | |
|---|---|---|---|---|---|---|---|---|---|
| | | Hr. | ml | 2 Hrs | 4 Hrs | 6 Hrs | 9 Hrs | 12 Hrs | 15 Hrs |
| control | 0 | 13 | 4 | 33 | 53 | 66 | 75 | 80 | 83 |
| Experiment No. 1 | 0.05 | 20 | 5 | 29 | 47 | 58 | 68 | 76 | 78 |
| 2 | 0.1 | 23 | 5 | 25 | 42 | 54 | 64 | 72 | 77 |
| 3 | 0.2 | 25 | 5 | 22 | 38 | 50 | 61 | 69 | 74 |
| 4 | 0.3 | 21 | 5 | 28 | 46 | 56 | 66 | 74 | 76 |
| 5 | 0.5 | 11 | 4 | 35 | 57 | 70 | 80 | 86 | 89 |
| 6 | 0.7 | 6 | 4 | 38 | 61 | 75 | 87 | 93 | 98 |
| 7 | 1.0 | 2 | 3 | 40 | 63 | 77 | 92 | 100 | 103 |
| 8 | 2.0 | 0 | — | 41 | 65 | 81 | 95 | 101 | 104 |
| 9 | 4.0 | 0 | — | 39 | 63 | 80 | 94 | 100 | 103 |

EXAMPLE 21

Four test samples of mixtures comprising 3.3 gr of $BaSO_3$, 0.08 gr of $FeCl_2.4 H_2O$ and 2.0 gr of $(NH_4)_2SO_4$ were prepared. Free water in an amount as shown in Table 6 was added to each of the mixtures. The resulting mixtures were placed in 4 sealed vessels respectively, and the test was carried out in the same way as in Example 18. The results are shown in Table 6.

Table 6

| Experiment No. | Amount of free water added (gr) | Latent period (Hrs) and amount of $O_2$ absorbed (ml) | | Amount of $O_2$ absorbed with time (in hours) after the latent period (ml) | | | | | |
|---|---|---|---|---|---|---|---|---|---|
| | | Hr. | ml | 2 Hrs | 4 Hrs | 6 Hrs | 9 Hrs | 12 Hrs | 15 Hrs |
| 1 | 0.68 | 0 | — | 41 | 65 | 81 | 95 | 101 | 104 |
| 2 | 0.7 | 2 | 3 | 41 | 65 | 80 | 94 | 100 | 103 |
| 3 | 0.8 | 6 | 4 | 39 | 61 | 75 | 86 | 92 | 96 |
| 4 | 0.9 | 8 | 4 | 38 | 60 | 74 | 85 | 90 | 94 |

EXAMPLE 22

Five test samples of mixtures comprising 0.8 gr of $CaSO_3.1/2 H_2O$, 0.4 gr of $Ca(HSO_3)_2$, 1.5 gr of $MgSO_3.6 H_2O$, 0.2 gr of $Mg(HSO_3)_2$, 0.2 gr of $BaSO_3$, 0.3 gr of $(COO)_2Fe.2H_2O$ and 0.5 gr of free water were prepared. Ammonium sulfate in an amount as shown in Table 7 was added to each of the mixtures. The resulting mixtures were placed in 5 sealed vessels respectively, and the test was carried out in the same way as in Example 18. The results are shown in Table 7.

Table 7

| | Amount of $(NH_4)_2SO_4$ added (gr) | Latent period (Hrs) and amount of $O_2$ absorbed (ml) | | Amount of $O_2$ absorbed with time (in hours) after the latent period (ml) | | | | | |
|---|---|---|---|---|---|---|---|---|---|
| | | Hr. | ml | 2 Hrs | 4 Hrs | 6 Hrs | 9 Hrs | 12 Hrs | 15 Hrs |
| Control | 0 | 11 | 4 | 36 | 57 | 71 | 86 | 99 | 106 |
| Experiment No. 1 | 0.5 | 13 | 4 | 31 | 50 | 64 | 80 | 92 | 101 |
| 2 | 1.0 | 5 | 3 | 40 | 62 | 76 | 93 | 103 | 109 |
| 3 | 2.0 | 2 | 3 | 45 | 64 | 80 | 95 | 105 | 111 |
| 4 | 4.0 | 0 | — | 47 | 66 | 81 | 96 | 106 | 112 |

EXAMPLE 23

The procedure of Example 22 was repeated except that 3.0 gr of ammonium sulfate and free water in an amount as shown in Table 8 were used. The results are shown in Table 8.

Table 8

| Experiment No. | Amount of free water added | Latent period (Hrs) and amount of $O_2$ absorbed (ml) | | Amount of $O_2$ absorbed with time (in hours after the latent period (ml) | | | | | |
|---|---|---|---|---|---|---|---|---|---|
| | | Hrs | ml | 2 Hrs | 4 Hrs | 6 Hrs | 9 Hrs | 12 Hrs | 15 Hrs |
| 1 | 0.5 | 0 | — | 47 | 66 | 81 | 96 | 106 | 112 |
| 2 | 0.7 | 3 | 2 | 44 | 63 | 78 | 94 | 104 | 100 |
| 3 | 0.9 | 7 | 2 | 38 | 60 | 73 | 90 | 101 | 107 |
| 4 | 1.1 | 9 | 3 | 37 | 59 | 72 | 87 | 100 | 100 |

EXAMPLE 24

Four test samples of a mixture comprising 1.9 gr of $CaSO_3$, 0.17 gr of $FeSO_4$ and 0.7 gr of free water were prepared. Ammonium chloride, ammonium nitrate and ammonium acetate in the respective amounts shown in Table 9 were added to each of the mixtures. The resulting mixtures were placed in 4 sealed vessles respectively. The test was carried out in the same way as in Example 18. The results are shown in Table 9.

Table 9

| Experiment No. | kinds of amount of ammonium salts added (gr) | | Latent period (Hrs) and amount of oxygen absorbed (ml) | | Amount of $O_2$ absorbed with time (in hours) after the latent period (ml) | | | | | |
|---|---|---|---|---|---|---|---|---|---|---|
| | Kinds | amount | Hrs | ml | 2 Hrs | 4 Hrs | 6 Hrs | 9 Hrs | 12 Hrs | 15 Hrs |
| Control | — | — | 12 | 5 | 58 | 80 | 92 | 101 | 108 | 111 |
| 1 | $NH_4Cl$ | 1.0 | 46 | 2 | 43 | 62 | 73 | 89 | 103 | 113 |
| 2 | $NH_4NO_3$ | 0.25 | 20 | 3 | 33 | 50 | 65 | 82 | 94 | 102 |
| 3 | $CH_3COONH_4$ | 0.25 | 15 | 4 | 24 | 42 | 58 | 75 | 87 | 92 |

What is claimed is:

1. An oxygen absorbent consisting essentially of at least one alkaline earth metal sulfite, at least one ferrous salt and free water, the amount of the free water being from about 2 to about 200 parts by weight per 100 parts by weight of the combined weight of the sulfite and the ferrous compound, and the amount of the ferrous salt being from about 0.1 part to about 150 parts by weight of the sulfite.

2. The oxygen absorbent as defined in claim 1 including at least one filler selected from the group consisting of gypsum, cellulose, diatomaceous earth, activated carbon, pearlite, zeolite, $BaSO_4$, activated clay and silica gel.

3. An oxygen absorbent as defined in claim 1 wherein the alkaline earth metal sulfite is anhydrous.

4. An oxygen absorbent as defined in claim 1 wherein the alkaline earth metal sulfite is hydrous.

5. An oxygen absorbent as defined in claim 1 wherein the ferrous salt is ferrous sulfate, ferrous chloride, ferrous bromide, ferrous nitrate, ferrous phosphate, ferrous oxalate, ferrous formate or mixtures thereof.

6. An oxygen absorbent as defined in claim 1 wherein the ferrous salt is in the form of a metal chelate thereof.

7. An oxygen absorbent as defined in claim 1 containing from about 0.05 to about 1 equivalent of an alkaline material per equivalent of the ferrous salt, said alkaline material comprising a material which has a pH of more than 7 in admixture with water.

8. An oxygen absorbent consisting essentially of at least one alkaline earth metal sulfite, at least one ferrous salt, at least one ammonium salt, and free water, the amount of the free water being from about 2 to about 200 parts by weight per 100 parts by weight of the combined weight of the sulfite, the ferrous salt and the ammonium salt, the amount of the ferrous salt being from about 0.1 part to about 150 parts by weight of the sulfite, and the amount of the ammonium salt being at least 1 part by weight per 100 parts by weight of the sulfite.

9. The oxygen absorbent as defined in claim 8 including at least one filler selected from the group consisting of gypsum, cellulose, diatomaceous earth, activated carbon, pearlite, zeolite, $BaSO_4$, activated clay and silica gel.

10. An oxygen absorbent as defined in claim 8 wherein the ammonium salt is an ammonium salt of an inorganic acid.

11. An oxygen absorbent as defined in claim 8 wherein the ammonium salt is an ammonium salt of an organic acid.

* * * * *